United States Patent Office 3,177,162
Patented Apr. 6, 1965

3,177,162
METHOD OF PRODUCING A POLYMER FROM A CYANO - SUBSTITUTED DIVALENT RADICAL SPECIES
Robert M. Kliss, Marblehead, and John E. Harris, Hyde Park, Mass., assignors to Monsanto Research Corporation, St. Louis, Mo., a corporation of Delaware
No Drawing. Filed May 17, 1962, Ser. No. 195,369
6 Claims. (Cl. 260—2)

This invention relates to a novel method of forming reactive intermediates, and more particularly, provides a novel method of producing reactive disubstituted carbon atoms which are intermediates for the production of valuable products.

It is known that substituents may be removed from a carbon atom so as to leave it in an activated state, in which it is highly reactive. Two substituents may be removed from a single carbon atom so as to leave a divalent species of intermediate, called a carbene. Capture of a carbene by an olefin can be used, for example, to form a cyclopropane.

One recognized method of forming a carbene comprises decarboxylation of an alpha-halogenated acetate salt. The resulting species of intermediate is a dihalocarbene. Thus, heating sodium trichloroacetate in a nonprotonic solvent in the presence of an olefin yields the cyclopropanes formed by dichlorocarbene (Proc. Chem. Soc. 1959, 229).

Dihalocarbenes can be made in a number of ways besides the decarboxylation method. However, the cyano-substituted divalent radical species has proved elusive, and attempts to trap a halocyanocarbene with an olefin have been unavailing. Decarboxylation of a cyanohaloacetate, by analogy with the decarboxylation of a trihaloacetate, appeared to be a possible approach to formation of such radicals. However, the cyanohaloacetate salts are not available. Thus the decarboxylation approach to formation of a cyano-substituted divalent radical species, from which valuable and unusual stable products could be formed, would appear to be excluded.

It is an object of this invention to provide a novel method of producing a divalent cyano-substituted radical species.

A particular object of this invention is to provide a novel method of producing a cyano-substituted divalent radical species from readily available starting materials.

These and other objects will become evident from a consideration of the following specification and claims.

It has now been found that decarboxylation of a haloacetate salt in the presence of cyanide ion produces a reactive cyano-substituted divalent radical species from which valuable products are formed.

Since the trihaloacetate salts are readily available and cyanides are common industrial materials, the present novel method provides a particular advantageously direct and inexpensive way of arriving at cyano-substituted divalent radical species. Cyano-substituted divalent radical species can add to form a variety of valuable and useful products. Thus for example, as described and claimed in copending application Ser. No. 195,437, filed concurrently herewith by Robert J. Wineman, Clifford N. Matthews, and Robert M. Kliss, the cyano-substituted divalent radical species can associate to form polymers having unusual and valuable properties such as semiconductor properties. It is found that the present method produces polymers of the same characteristics as that formed by the method of the stated application employing a cyano-substituted organic starting material, thus showing that the cyano group is introduced into the organic intermediate species formed by the method of the present invention.

In couducting the method of the invention, a trihaloacetate metal salt will form the organic starting material. Any of the various trihaloacetate salts may be employed in this connection. The halogen substituents may be any combination of fluorine, chlorine, bromine and iodine. The haloacetates containing at least one fluorine substituent are a particularly preferred species for use in the method of this invention, and illustrative of these are salts such as those of chlorodifluoroacetic acid, dibromofluoroacetic acid, dichlorofluoroacetic acid, dibromofluoroacetic acid, trifluoroacetic acid and the like.

The method of the invention can most advantageously be practiced using alkali metal salts, such as those of sodium, potassium and lithium. Thus salts such as sodium chlorodifluoroacetate, sodium chlorodifluoroacetate, sodium dichlorofluoroacetate, potassium chlorodifluoracetate, sodium dibromochloroacetate, lithium dichlorofluoroacetate, sodium diiodofluoroacetate, potassium trichloroacetate and the like form a preferred type of organic starting material.

The sources of cyanide ion may similarly be varied, and constitute any inorganic salt such as cyanides of iron, nickel, zinc, molybdenum, lead, copper or the like. However, metals with d-orbital electrons tend to chelate with the products of the present reaction. Therefore, best results can be obtained using simple alkali metal salts, and there are preferred. Thus for example, the cyanide salt employed in the practice of the method may be sodium cyanide, posassium cyanide or the like.

The ratio of the metal cyanide salt and the trihaloacetate salt may vary over the range from a 1:10 to a 10:1 molar ratio. About equal molar amounts of the two, corresponding to the stoichiometry of the reaction, will be employed to avoid presence of excess cyanide at the completion of the reaction.

The reactants will be associated, in conducting the method of the invention, in a solvent or diluent. Useful solvents are organic polar non-protonic liquids such as dimethylformamide, dimethylsulfoxide, 1,2 - dimethoxyethane, tetrahydrofuran, the dimethyl ether of diethylene glycol, dioxane, acetonitrile, diethyl carbonate, anisole, and the like.

The temperatures required for the decarboxylation are relatively low. In general, favorable temperatures sufficient to effect the decarboxylation will be between about 50° and 150° C. However, where desired, with appropriate adjustment of other conditions, the temperature may be varied from below room temperature up to below the decomposition temperature of the reaction mixture components. Sub- and superatmospheric pressures may be employed, ranging down to about say 50 mm. Hg. and up to say about 5000 p.s.i., but in most cases atmospheric pressure is suitable. On completion of the reaction, usual procedures such as extraction, distillation and filtration may be employed to isolate the reaction products.

The invention is illustrated but not limited by the following examples in which all parts are by weight unless otherwise noted.

*Example 1*

A mixture of 153 parts of sodium chlorodifluoroacetate (0.1 mole) and 50 parts of sodium cyanide (about 0.1 mole) in anhydrous dimethylformamide is stirred for four hours under nitrogen at 50–60° C. The dark-colored reaction product is filtered and the filtrate is concentrated under reduced pressure. The solid residue is separated and combined with solid formed by addition of water to the oil remaining after concentration. The solids are washed with water to remove inorganics, and then extracted with benzene. Concentration of this organic extract yields a black polymer having an infrared spectrum characterizing it as a conjugated material produced by self-polymerization of fluorocyano-substituted divalent carbon biradicals.

Example 2

A mixture of 153 parts of sodium chlorodifluoroacetate and 50 parts of sodium cyanide in the dimethyl ether of diethylene glycol is refluxed for two days. Polymer having the brown-black color characteristic of the conjugated structures formed by polymerization of the cyano-substituted divalent biradical species is formed.

Example 3

This example illustrates the reaction of sodium trichloroacetate with sodium cyanide to provide a polymer containing conjugated —C=N—C.

Thirty-seven parts of sodium trichloroacetate (0.2 mole) and 10 parts of sodium cyanide (~0.2 mole are combined in solution in dimethylformamide. After an initial slight exotherm has dropped off, the mixture is heated to about 90° C., and heating at this temperature is continued for two days. Dark brown solids are collected on removing the solvent by evaporation, and the solids contain polymer corresponding to that produced in the previous examples, except that all halogen substituents are chlorine.

While the invention has been illustrated with reference to specific preferred embodiments thereof, it is to be appreciated that modifications and variations can be made without departing from the scope of the invention, which is limited only as described in the appended claims.

What is claimed is:

1. The method of producing a polymer from a cyano-substituted divalent radical species which comprises maintaining an alkali metal salt of a trihaloacetate at a temperature sufficient to effect its decarboxylation in the presence of an inorganic cyanide salt in a non-protonic organic liquid solvent, and recovering polymer from the resulting reaction product.

2. The method of claim 1 in which at least one of the substituents of said trihaloacetate is fluorine.

3. The method of producing a polymer from a cyano-substituted divalent radical species which comprises maintaining an alkali metal salt of a trihaloacetate in which at least one of said halogens is fluorine at a temperature sufficient to effect its decarboxylation in the presence of an alkali metal cyanide salt in a non-protonic organic liquid solvent, and recovering polymer from the resulting reaction product.

4. The method of producing a polymer from a fluorocyanosubstituted divalent radical species which comprises maintaining the sodium salt of a fluorine-substituted trihaloacetate at a temperature sufficient to effect its decarboxylation in the presence of sodium cyanide in a non-protonic organic liquid solvent, and recovering polymer from the resulting reaction product.

5. The method of producing a polymer from a fluorocyano-substituted divalent radical species which comprises maintaining sodium dichlorofluoroacetate at a temperature sufficient to effect its decarboxylation in the presence of sodium cyanide in a non-protonic organic liquid solvent, and recovering polymer from the resulting reaction product.

6. The method of producing a polymer from a chlorocyano-substituted divalent radical species which comprises maintaining sodium trichloracetate at a temperature sufficient to effect its decarboxylation in the presence of sodium cyanide in a non-protonic organic liquid solvent, and recovering polymer from the resulting reaction product.

References Cited by the Examiner

Wagner: Proc. Chem. Soc., page 229 (1959).
Noller: Chemistry of Organic Compounds, page 249, Saunders Co., Philadelphia (1957).

WILLIAM H. SHORT, *Primary Examiner.*